(12) United States Patent
Cooper

(10) Patent No.: US 6,448,512 B1
(45) Date of Patent: Sep. 10, 2002

(54) WEIGHT SENSING APPARATUS

(75) Inventor: Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 38 days.

(21) Appl. No.: 09/644,116

(22) Filed: Aug. 22, 2000

(51) Int. Cl.$^7$ .................. G01G 19/52; G01G 23/14; B60T 7/14
(52) U.S. Cl. .................. 177/144; 180/273; 280/735; 177/168; 177/170
(58) Field of Search ................... 177/136, 144, 177/168, 171, 170; 180/273; 280/735

(56) References Cited

U.S. PATENT DOCUMENTS

| | | | |
|---|---|---|---|
| 2,708,005 A | 5/1955 | Gazzo | 180/273 |
| 3,022,976 A | 2/1962 | Zia | 248/430 |
| 3,766,344 A | 10/1973 | Nevett | 200/85 A |
| 4,075,443 A | 2/1978 | Fatur | 200/85 A |
| 4,361,741 A | 11/1982 | Leskoverc et al. | 200/85 A |
| 5,232,243 A | 8/1993 | Blackburn et al. | 280/732 |
| 5,481,078 A | 1/1996 | Asche | 200/85 A |
| 5,502,284 A | 3/1996 | Meiller et al. | 200/85 A |
| 5,542,493 A | 8/1996 | Jacobsen et al. | 180/272 |
| 5,624,132 A | 4/1997 | Blackburn et al. | 280/735 |
| 5,720,523 A | 2/1998 | Kawabata et al. | 297/338 |
| 5,739,757 A | 4/1998 | Gioutos | 340/667 |
| 5,810,392 A | 9/1998 | Gagnon | 280/735 |
| 5,864,295 A | 1/1999 | Jarocha | 340/667 |
| 5,877,677 A | 3/1999 | Fleming et al. | 340/436 |
| 6,069,325 A * | 5/2000 | Aoki | 177/136 |
| 6,323,444 B1 * | 11/2001 | Aoli | 177/144 |

* cited by examiner

Primary Examiner—Randy W. Gibson
(74) Attorney, Agent, or Firm—Tarolli, Sundheim, Covell, Tummino & Szabo L.L.P.

(57) ABSTRACT

A vehicle has a seat (12) for a vehicle occupant (14) and a vehicle floor pan (16) for supporting the vehicle seat (12). An apparatus (40) includes a vehicle seat frame (42) for supporting a weight load of the vehicle occupant (14) in the vehicle seat (12), a support mount (60) connected to the vehicle floor pan (16), a lever (70), and a sensor (80). A support mount (60) transmits the weight load of the vehicle occupant (14) in the vehicle seat (12) from the vehicle seat frame (42) to the vehicle floor pan (16). The vehicle seat frame (42) moves vertically relative to the support mount (60) as the weight load on the vehicle seat frame (42) changes. The lever (70) has a first end (72) and a second end (74) opposite the first end (72). The lever (70) is rotatably attached to the vehicle seat frame (42) and rotatably attached to the support mount (60). The lever (70) has a portion (76) which bends when the weight load of the vehicle occupant (14) is transmitted by the lever (70) from the vehicle seat frame (42) to the support mount (60). The sensor (80) detects bending of the portion (76) of the lever (70) and provides an output weight signal indicative of the amount of bending of the portion (76) of the lever (70).

15 Claims, 1 Drawing Sheet

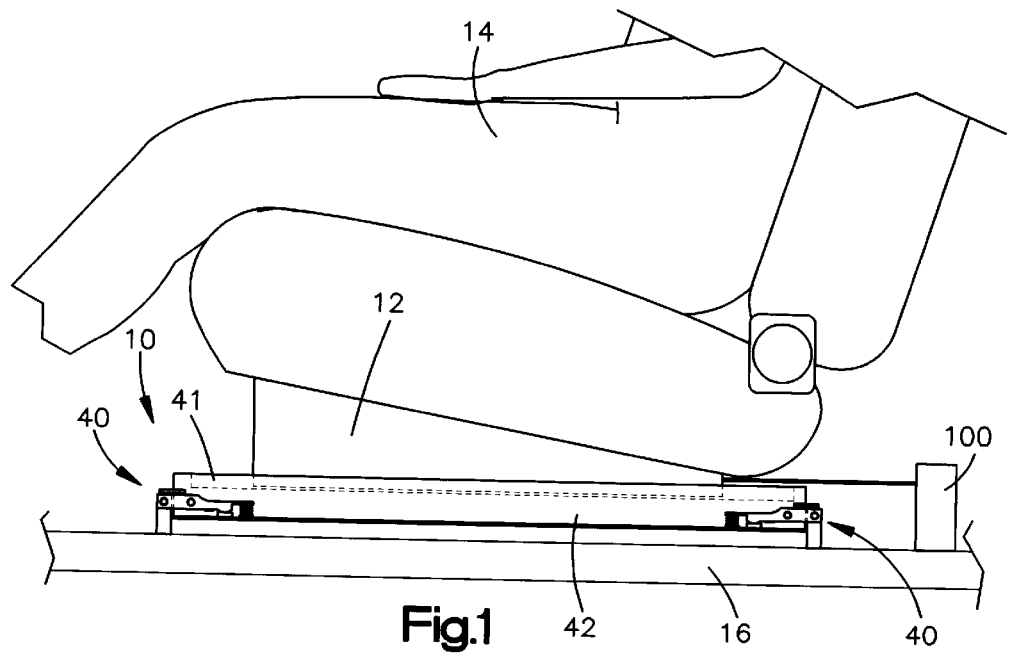
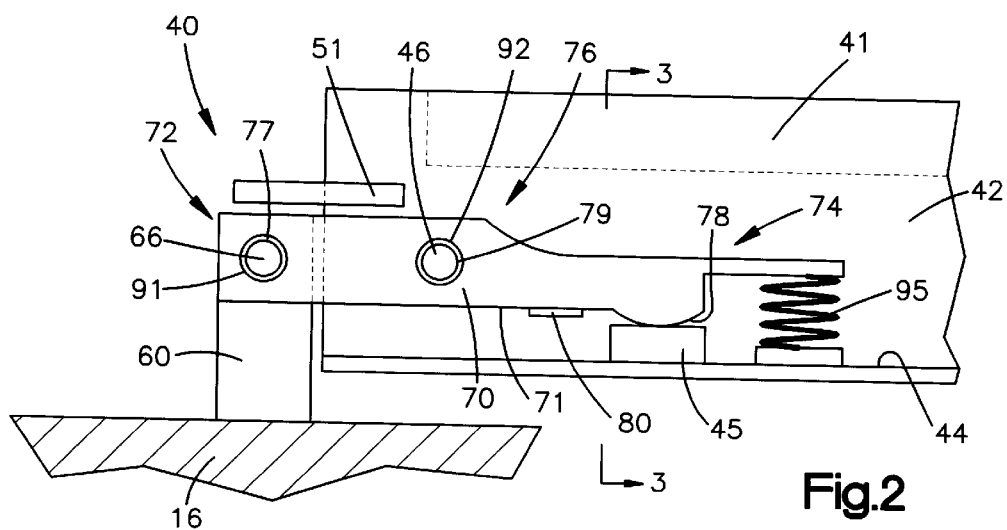
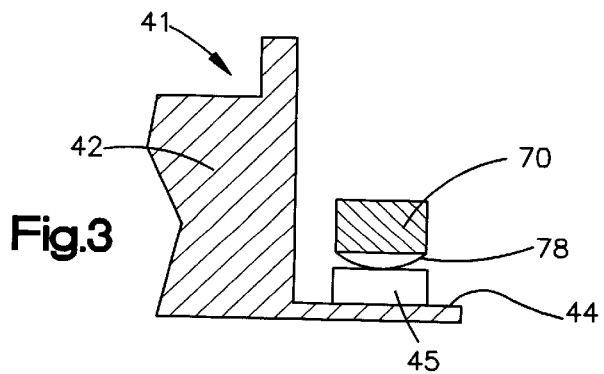

WEIGHT SENSING APPARATUS

TECHNICAL FIELD

The present invention relates to an apparatus for sensing weight, and more particularly, to an apparatus for sensing the weight of an occupant of a vehicle seat.

BACKGROUND OF THE INVENTION

A conventional vehicle occupant weight sensing apparatus includes a weight sensor placed between a vehicle seat frame and a support mount for the seat. The sensor is directly within the vertical load path of the occupant's weight and responds to the weight of the occupant of the seat. In addition, the sensor may respond to torque loads between the seat and the support mount. Since the seat frame and the support mount must withstand large lateral loads (i.e., during crash conditions), typically the sensor also must withstand large lateral loads.

Accordingly, the sensor is typically constructed to withstand lateral loads. This may lessen the sensitivity of the sensor in the vertical load path. Thus, the sensor may not produce a reliable weight output signal.

A weight sensing apparatus which decouples the lateral and vertical loads would allow the construction of a weight sensor that does not have to withstand lateral loads and thereby may be more likely to produce a more accurate occupant weight output signal.

SUMMARY OF THE INVENTION

The present invention relates to an apparatus for use in a vehicle having a seat for a vehicle occupant and a vehicle floor pan for supporting the vehicle seat. The apparatus includes a seat frame for supporting the vehicle seat, a support mount connected to the vehicle floor pan, a lever, and a sensor. The vehicle seat frame supports a weight load of the vehicle occupant in the vehicle seat. The support mount transmits the weight load of the vehicle occupant in the vehicle seat from the vehicle seat frame to the vehicle floor pan. The seat frame moves vertically relative to the support mount as the weight load on the vehicle seat frame changes. The lever has a first end and a second end opposite the first end. The lever is rotatably attached to the vehicle seat frame and rotatably attached to the support mount. The lever has a portion which bends when the weight load of the vehicle occupant is transmitted by the lever from the vehicle seat frame to the support mount. The sensor detects bending of the portion of the lever and provides an output weight signal indicative of the amount of bending of the portion of the lever.

BRIEF DESCRIPTION OF THE DRAWINGS

The foregoing and other features of the invention will become more apparent to one skilled in the art upon consideration of the following description of the invention and the accompanying drawings wherein:

FIG. 1 is a schematic view of an assembly embodying the present invention;

FIG. 2 is a detail view of part of the assembly of FIG. 1; and

FIG. 3 is a sectional view taken along line 3—3 in FIG. 2.

DESCRIPTION OF THE PREFERRED EMBODIMENTS

According to the present invention as viewed in FIGS. 1–3, an assembly 10 with four weight sensing apparatuses 40 (two are shown in the drawings) is used in a vehicle. The vehicle has a seat 12 for a vehicle occupant 14 and a vehicle floor pan 16 for supporting the vehicle seat 12 and the vehicle occupant 14. Each apparatus 40 connects to a corner of a seat frame 42 for supporting the vehicle seat 12. Each apparatus 40 includes a support mount 60 connected to the vehicle floor pan 60, a lever 70, and a sensor 80.

The vehicle seat frame 42 is biased by springs (not shown) to an initial position when the seat 12 is not occupied. When the seat 12 is occupied by the vehicle occupant 14, the vehicle seat frame 42 supports a weight load of the vehicle occupant 14 in the vehicle seat 12. The seat frame 42 moves vertically downward (as shown in the drawings) relative to the support mount 60 as the weight load on the vehicle seat frame 42 increases. Typically, the seat frame 42 moves downward a maximum of 3mm. As the weight load on the seat 12 decreases, the seat 12 will move vertically upward due to the bias on the seat frame 42. The seat frame 42 includes a horizontal load surface 44 and an elastomer body 45 is located on the load surface 44.

The support mount 60 transmits the weight load of the vehicle occupant 14 in the vehicle seat 12 from the vehicle seat frame 42 to the vehicle floor pan 16. The support mount 60 is fixed to the vehicle floor pan 16. The support mount 60 is typically constructed of an elastic material, such as metal, so that the upper portion of the support mount 60 can deflect slightly laterally. The deflection is towards the right in FIG. 2 as the weight on the seat frame 42 increases above a predetermined weight.

The lever 70 has a first end portion 72 and a second end portion 74 opposite the first end portion 72. The lever 70 is rotatably attached to the vehicle seat frame 42 and is rotatably attached to the support mount 60. A first cylindrical support pin 66 is fixedly attached to the support mount 60 and a second cylindrical support pin 46 is fixedly attached to the seat frame 42. The first support pin 66 is rotatably connected to the first end portion 72 of the lever 70 and the second support pin 46 is rotatably connected to a central portion 76 of the lever 70. Alternatively, the support pins 46, 66 may be fixedly attached to the lever 70 and rotatably connected to the vehicle seat frame 42 and the support mount 60, respectively.

The lever 70 further includes a first circular opening 77 in the first end portion 72 sized to receive the first support pin 66 and a second circular opening 79 in the central portion 76 sized to receive the second support pin 46. A first bushing 91 engages the lever 70 and the first support pin 66 of the support mount 60 and facilitates relative rotation between the lever 70 and the support mount 60. A second bushing 92 engages the lever 70 and the second support pin 46 of the vehicle seat frame 42 and facilitates relative rotation between the lever 70 and the seat frame 42.

The second end portion 74 of the lever 70 has a thinner vertical dimension (as viewed in FIG. 2) than the vertical dimension of the first end portion 72 and the central portion 76 of the lever 70. A sensor 80 such as a strain gauge is mounted on the second end portion 74 of the lever 70. The thinner dimension of the second end portion 74 enables the second end portion 74 of the lever 70 to bend, and the sensor 80, in turn, generates an output signal in response to the bending.

The second end portion 74 of the lever 70 has a part 78 which is spherically shaped. The spherically shaped part 78 preferably engages the elastomer body 45 on the horizontal load surface 44 of the seat frame 42 when a vehicle occupant 14 occupies the vehicle seat 12. Instead of the elastomer body 45 on the surface 44, the spherically shaped part 78 of the lever 70 may have an elastomeric coating which engages the surface 44. Alternatively, the part 78 of the lever 70 may directly engage surface 44.

The spherical shape of the part 78 creates an essentially single point contact between the lever 70 and the elastomer body 45. The single point contact allows the second end portion 74 of the lever 70 to pivot relative to the surface 44 and to slide easily on the horizontal load surface 44.

The elastomer body 45 provides a low friction contact with the spherically shaped part 78 of the lever 70. The elastomer body 45 also prevents deformation of the spherically shaped part 78 or surface 44 after repeated use of the seat 12 and apparatus 40, as might occur if the spherically shaped part 78 directly engaged surface 44.

When an occupant 14 sits in the vehicle seat 12, the weight of the occupant 14 is transmitted through pin 46, bushing 92, lever 70, bushing 77, and pin 66 to the support mount 60. This could result in the upper portion of support mount 60 deflecting somewhat to the right in FIG. 2 if the occupant's weight is above a predetermined threshold. Also, since the second end portion 74 of the lever 70 can easily slide on the elastomer body 45, the lever 70 does not resist this deflection of the support mount 60. Also, the material of the second end portion 74 of the lever 70, where the sensor is located, bends in proportion to the weight of the occupant 14. The sensor 80 senses the bending and provides an electrical output signal proportional to the bending.

The second end portion 74 of the lever 70 bends because the lever 70 pivots about the axis of pin 66. Pin 46 is located closer to the axis of pin 66 than the point of contact of the spherically shaped part 78 and the elastomer body 45. Thus, the point of contact of the spherically shaped part 78 and the elastomer body 45 tends to want to move downward further than the pin 46 for any given occupant weight. However, this point of contact can not move downward a greater distance than pin 46 moves downward. Thus, the second end portion 74 of the lever 70 bends. Moreover, the downward force which the part 78 applies to the elastomer body 45 varies with occupant weight.

The sensor 80 detects bending of the lever 70 and provides an output weight signal indicative of the amount of bending of the lever 70. The sensor 80 preferably is located on a lower surface 71 of the second end portion 74 of the lever 70.

A limit stop 51 may restrict vertical pivoting movement of the lever 70. The limit stop 51 may be placed above the first end portion 72 of the lever 70 and the support mount 60. The limit stop 51 is typically mounted to the vehicle seat frame 42 as a cantilever extending above the support mount 66. The limit stop 51, which moves downward with the seat frame 42, will abut the upper surface of the support mount 60 when the seat frame 42 moves downward a predetermined amount. The limit stop 51 will prevent excessive straining of the lever 70 under conditions of extreme vertical loading.

A tension spring 95 may be used for maintaining contact between the horizontal load surface 44 of the vehicle seat frame 42 and the second end portion 74 of the lever 70. The spring 95 may be an elastic element such as a coil spring. The spring 95, when unloaded, has an axial length less than that shown in FIG. 2. The spring is expanded axially, and then the spring is attached to the second end portion 74 of the lever 70 and to the surface 44. The spring 95 thus biases the lever 70 downward as shown in FIG. 2. This maintains contact between the lever 70 and the elastomer body 45 and reduces rattle or other noise due to vibration of the lever 70. Other spring arrangements may be used to bias the lever downward into engagement with the elastomer body 45. Any initial bending of the lever 70 created by the spring 95 may be treated as an offset in the sensor's output when the sensor 80 is calibrated.

Alternatively, a slight space may be maintained between the horizontal load surface 44 of the vehicle seat frame 42 and the second end portion 74 of the lever 70 when the vehicle seat 12 is unoccupied. When the occupant 14 puts weight on the vehicle seat 12, the horizontal load surface 44 of the vehicle seat frame 42 and the second end portion 74 of the lever 70 will abut before bending of the lever 70 begins.

Typically, two pairs of the apparatuses 40 (one pair shown in FIG. 1) comprise an assembly 10 which supports a vehicle seat 12 with an apparatus 40 at each corner of the seat 12. The four output weight signals can be analyzed by a controller (not shown) to produce output signals for controlling an occupant protection device such as an air bag, seat belt, etc.

The vehicle seat 12 is adjustably connected to the seat frame 42. A means 100, such as a motor and drive, adjusts the location of the vehicle seat 12 in the vehicle for occupants of different heights. The adjustment occurs by actuation of the means 100, which, when actuated, moves the vehicle seat 12 in a seat guide track 41 on the seat frame 42 forward or rearward in the vehicle.

From the above description of the invention, those skilled in the art will perceive improvements, changes, and modifications. For example, a load cell sensor (not shown) could be used as opposed to the strain gauge. A load cell would be mounted on the elastomer body 45 or on the spherically shaped part 78 of the lever 70 which engages the elastomer body 45. Such a load cell would provide an output signal indicative of the load between the lever 70 and the elastomer body 45 which load is proportional to the weight of the vehicle occupant 14 on the seat 12. Such improvements, changes, and modifications within the normal skill of the art are intended to be included within the scope of the appended claims.

Having described the invention, the following is claimed:

1. An apparatus for use in a vehicle having a seat for a vehicle occupant and a vehicle floor pan for supporting the vehicle seat, said apparatus comprising:

a vehicle seat frame for supporting a weight load of the vehicle occupant in the vehicle seat;

a support mount for transmitting the weight load of the vehicle occupant in the vehicle seat from the vehicle seat frame to the vehicle floor pan, said seat frame moving vertically relative to said support mount as the weight load on said seat frame changes;

a lever having a first end and a second end opposite said first end, said lever being rotatably attached to said seat frame and rotatably attached to said support mount, said lever having a portion which bends when the weight load of the vehicle occupant is transmitted by said lever from said seat frame to said support mount; and a sensor for detecting bending of said portion of said lever and providing an output weight signal indicative of the amount of bending of said portion of said lever.

2. The apparatus as defined in claim 1 further including a first support pin fixedly attached to said support mount and a second support pin fixedly attached to said seat frame.

3. The apparatus as defined in claim 2 wherein said first support pin is rotatably connected to said first end of said lever and said second support pin is rotatably connected to said portion of said lever.

4. The apparatus as defined in claim 1 wherein said support mount is adapted to be fixed to the vehicle floor pan.

5. The apparatus as defined in claim 1 wherein said second end of said lever has a part which is spherically shaped.

6. The apparatus as defined in claim 2 wherein said lever includes a first opening for receiving said first support pin and a second opening for receiving said second support pin.

7. The apparatus as defined in claim 1 further including at least one limit structure for restricting vertical movement of said lever.

8. The apparatus as defined in claim 1 wherein said seat frame includes a load surface, said load surface having an elastomer located thereon.

9. The apparatus as defined in claim 1 further including a spring for maintaining contact between said second end of said lever and said seat frame.

10. The apparatus as defined in claim 1 wherein said sensor is located on a lower surface of said lever.

11. An apparatus for use in a vehicle having a seat for a vehicle occupant and a vehicle floor pan for supporting the vehicle seat, said apparatus comprising:

a vehicle seat frame for supporting a weight load of the vehicle occupant in the vehicle seat, said seat frame having a load surface;

a support mount for transmitting the weight load of the vehicle occupant in the vehicle seat from the vehicle seat frame to the vehicle floor pan, said seat frame moving vertically relative to said support mount as the weight load on said vehicle seat frame changes;

a lever having a first end portion rotatably attached to said support mount, a central portion rotatably attached to said vehicle seat frame, and a second end portion opposite said first end portion, said second end portion engaging said load surface of said seat frame with a force which varies with occupant weight when a vertical load is transmitted from said seat frame to said central portion of said lever; and a sensor which responds to the force of engagement between said lever and said seat frame and provides an output weight signal indicative of action of the force of engagement.

12. Apparatus as defined in claim 11 wherein said lever bends as said force of engagement increases and said sensor senses the bending of said lever.

13. The apparatus as defined in claim 12 further including a spring element for maintaining contact between said load surface of said seat frame and said second end portion of said lever.

14. The apparatus as defined in claim 13 wherein said spring element includes a coil spring.

15. The apparatus as defined in claim 12 wherein said second end portion of said lever has a thinner vertical dimension than the vertical dimension of said first end portion and said central portion of said lever.

* * * * *